G. DIOSZEGI.
ROTARY CULTIVATING MACHINE.
APPLICATION FILED JULY 8, 1921.
1,414,262.
Patented Apr. 25, 1922.
3 SHEETS—SHEET 3.
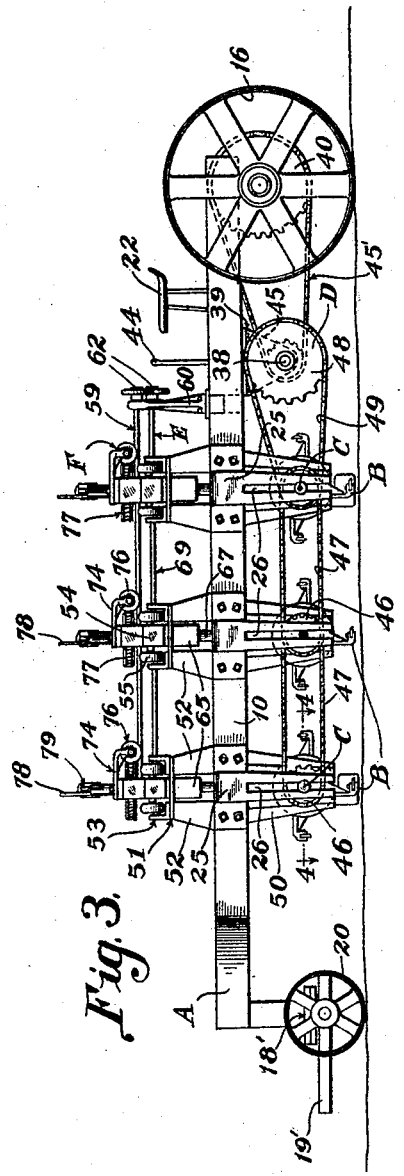
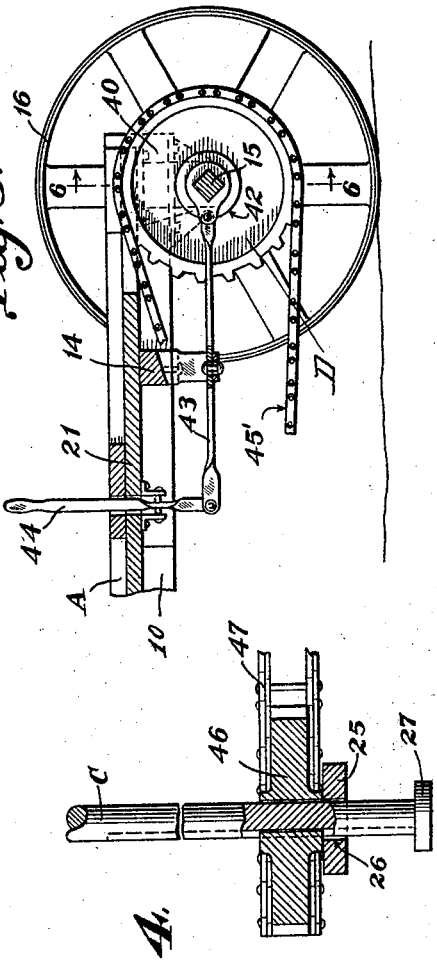
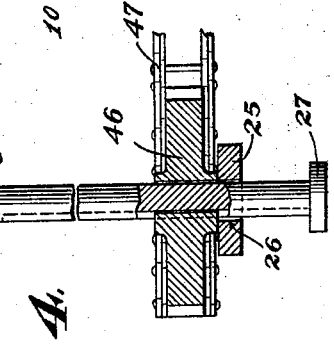
Inventor
Gerzony Dioszegi
By Lancaster and Allwine
Attorney

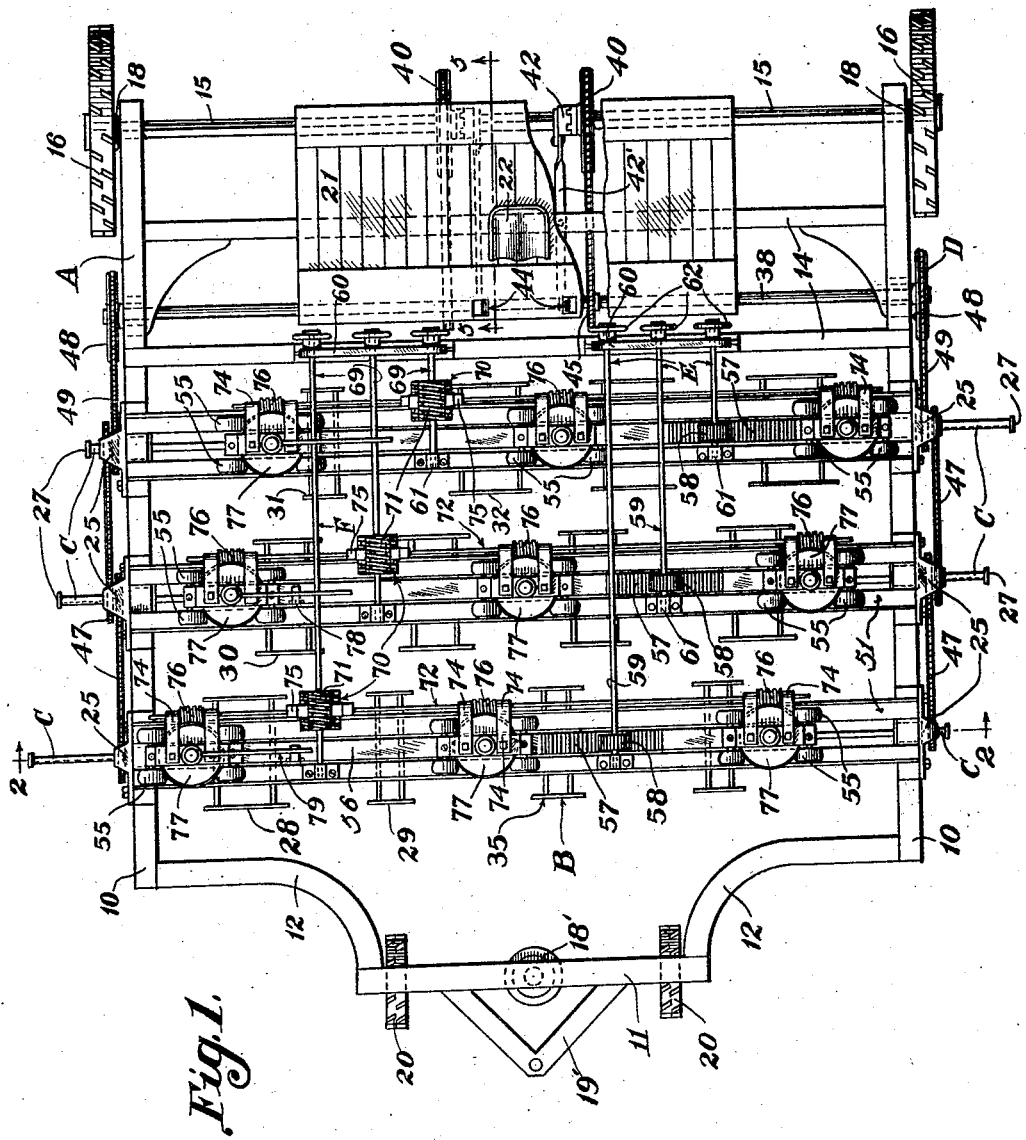

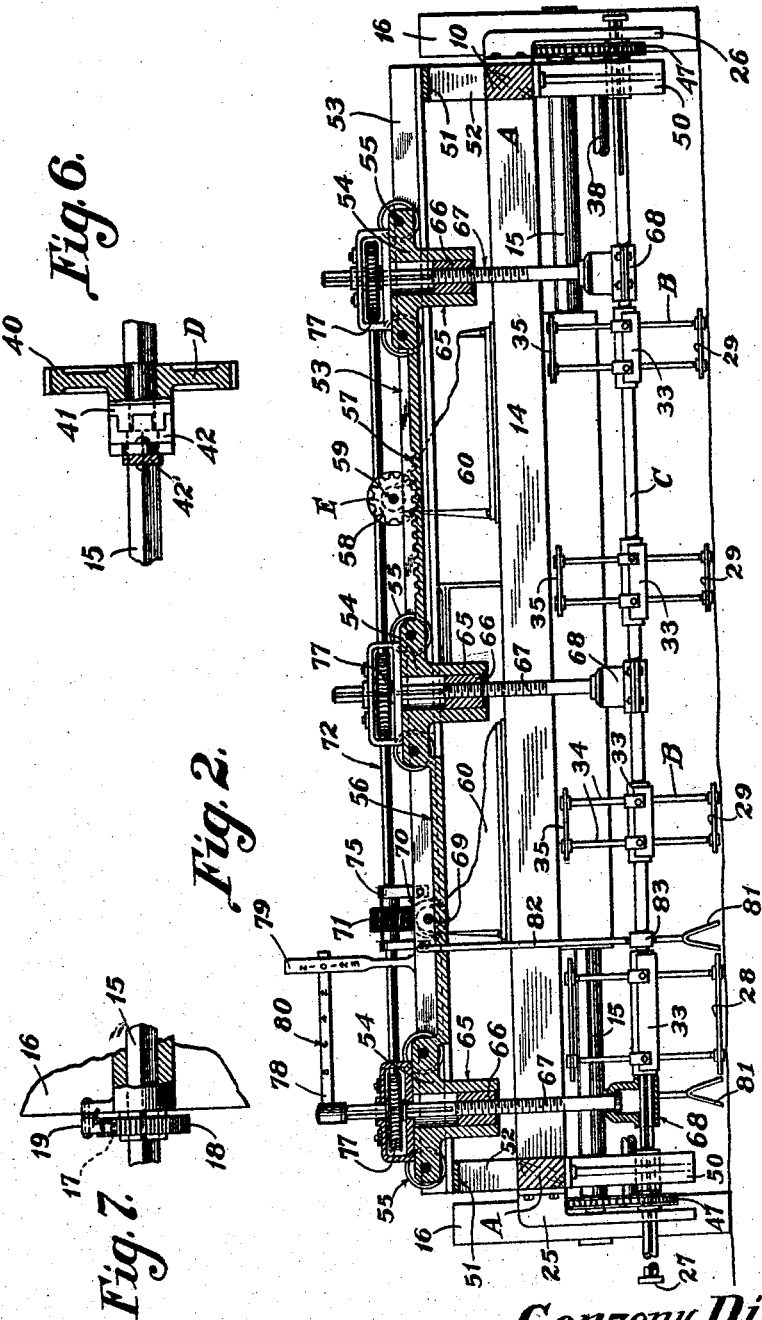

UNITED STATES PATENT OFFICE.

GERZONY DIOSZEGI, OF TRENTON, NEW JERSEY.

ROTARY CULTIVATING MACHINE.

1,414,262.　　　　　Specification of Letters Patent.　　Patented Apr. 25, 1922.

Application filed July 8, 1921. Serial No. 483,313.

*To all whom it may concern:*

Be it known that I, GERZONY DIOSZEGI, a subject of Hungary, residing at Trenton, in the county of Mercer and State of New Jersey, have invented certain new and useful Improvements in Rotary Cultivating Machines; of which the following is a specification.

This invention relates to cultivators of the rotary type, and the primary object of the invention is to provide an improved machine for simultaneously cultivating a plurality of rows of plants embodying a novel means for effectively destroying the weed growth and for scraping, pulverizing and working the ground around the plants.

Another object of the invention is to provide an improved rotary cultivator having a novel means for adjusting the cultivator members both laterally and vertically in relation to the frame of the machine, so that the same can be regulated to accord with the distance between the rows, and to accord with the desired depth at which the ground is to be worked.

A further object of the invention is to provide an improved cultivator embodying a plurality of transversely extending rotatable shafts, having novel cultivating implements of various widths arranged thereon, each of the implements embodying blades or hoes for chopping the weeds and working the ground, the cultivator embodying means for sliding the shafts to adjust the cultivator implements in relation to each other, whereby the width of the strip of land cultivated between the rows can be readily regulated.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a plan view of the improved rotary cultivating machine.

Figure 2 is a transverse section through the same taken on the line 2—2 of Figure 1, the front row of the cultivating implement only being shown in this view for clearness.

Figure 3 is a side elevation of the improved machine.

Figure 4 is a detail horizontal section taken on the line 4—4 of Figure 3, showing the means of mounting the implement carrying shaft.

Figure 5 is a detail fragmentary longitudinal section through the rear portion of the machine, taken on the line 5—5 of Figure 1.

Figure 6 is a detail section taken on the line 6—6 of Figure 5.

Figure 7 is an enlarged fragmentary detail section showing the means of connecting the ground or bull wheels to the drive axle.

Referring to the drawings in detail, wherein similar reference characters designate corresponding parts throughout the several views, the letter A indicates the frame of the improved machine; B, the sets of cultivator implements; C, the shafts carrying the sets of cultivator implements; D, the means for operating said shafts and sets of implements; and E and F, the means for shifting the shafts and sets of implements laterally and vertically in relation to the frame.

The frame A can be built of any preferred material, that is, out of structural steel or iron, or out of suitable timber, and includes the side beams 10, the front transverse beam 11, the connecting beams 12 for the side and front beams, and the transversely extending bracing beams 14. These beams 14 may be arranged at any preferred points on the frame for bracing the side beams, and as shown a pair of these beams are arranged relatively near the rear end of the machine. The side beams 10 carry suitable bearings for rotatably supporting the main drive axle 15, on which is rotatably mounted the ground or bull wheels 16. These wheels 16 may be provided with suitable cleats. These wheels 16 can be connected to the drive axle 15 in any preferred manner, that is by the way of clutches, so as to disconnect the axle from the wheels when so desired. As shown, the ground wheels 16 are operatively connected to the drive axle 15 by means of a ratchet and dog mechanism 17, which permits the turning of corners by the machine without any drag on the drive axle. As shown a ratchet wheel 18 is keyed or otherwise secured to the drive shaft 15 and is engaged by a pivoted dog 19 carried by the hub of the ground wheels 16. The front transverse bar 11 has secured thereto, by a suitable fifth wheel structure 18′, the forward truck 19′, which may have mounted thereon suitable ground engaging wheels 20.

It is to be understood that the machine can be drawn across the field in any preferred manner, that is, by means of a tractor or the like, but owing to the nature of the machine, it is preferred that the machine be drawn by draft animals. An operator's platform 21 is arranged at the rear end of the frame A, and can be secured to the transverse beams 14. This platform can support a suitable driver's seat or the like 22.

The sets of cultivator implements B are of course keyed or otherwise secured to the shafts C and these shafts extend transversely across the frame A. As shown, the shafts C are three in number, but more or less of the same may be provided as desirable or applicable. The shafts C are arranged for sliding movement laterally of the frame, for movement in a vertical plane, and for rotary movement, and are mounted in suitable depending brackets 25, which can be secured to the outer surfaces of the side beams 10. These brackets 25 are provided with slots 26, for receiving the shafts. The outer ends of the shafts can be provided with suitable heads or the like 27, in order to limit their sliding movement.

There can be as many cultivator implements upon the shafts C as may be desired, and as shown each shaft is provided with four cultivator implements, and the machine is adapted for cultivating four rows simultaneously. The first or forward shaft C has a set of the cultivator implements B arranged thereon, which include an end cultivating implement 28, and three other cultivating implements 29. The cultivating implement 28 is formed relatively wider than the cultivating implements 29, which are all of the same size. It is preferred that the implement 28 be formed sixteen inches wide, and the implements 29 eight inches wide. The set of cultivator implements B which are carried by the intermediate shaft C includes a plurality of implements 30, which are all of substantially the same width, and it is preferred that these implements be substantially twelve inches wide. The set of cultivator implements B which are arranged on the rear shaft C include a relatively narrow cultivator implement 31, and three relatively wide cultivator implements 32. It is preferred that the cutting implement 31 be eight inches wide, while the other three cultivator implements be sixteen inches wide.

All of the implements in the sets of cultivator implements B are constructed identically the same and each includes a hub or sleeve 33, which is keyed or otherwise secured to the shaft on which the implements are arranged, and radially extending pairs of arms 34, which are connected together by the blades or hoes 35. These blades are shown arranged in parallel relation with the shafts C, but it is to be understood that the same can be arranged at an angle thereto, in order to form a shearing cut, and if so desired the same may be provided with a saw tooth edge.

The operating means D for actuating the shafts C comprises a transversely extending operating shaft 38, which is rotatably mounted in suitable depending bearings 39, carried by the side beams 10. The shaft 38 is positively driven from the rear drive axle 15, and in order to equalize the draft on the rear axle, a pair of sprocket wheels 40 are rotatably mounted thereon. These sprocket wheels 40 are provided with clutch faces 41, which are adapted to be engaged by slidable clutch sections 42, which are feathered on the drive axle. Suitable operating levers 43, are pivotally connected intermediate their ends, and to the clutch sections, and these levers are provided with operating handles 44, which terminate adjacent to the driver's seat 22. It can be seen that these handles can be actuated to bring the clutch sections 42 into or out of engagement with the clutch sections 41, thereby permitting these sprocket wheels to rotate with the axle 15 when so desired. These sprocket wheels 40 are in direct alignment with relatively small sprocket wheels 45, which are keyed or otherwise secured to the operating shaft 38. These wheels 40 and 45 are connected by suitable sprocket chains 45. Now, while the clutches 42 have been shown used in connection with the sprocket wheels 40, it is to be understood that these sprocket wheels 40 could be connected directly with the drive axle 15, and that the clutches could be used in connection with the wheels 16 as heretobefore stated. The sliding shafts C have feathered thereon sprocket wheels 46, and these sprocket wheels 46 are connected together by suitable sprocket chains 47, which operatively connect the shafts together.

The operating shaft 38 is provided with a relatively large sprocket wheel 48, which is in alignment with a sprocket wheel carried by the rear shaft C, and these sprocket wheels are connected together by suitable drive sprocket chains 49. Thus it can be seen that all of the shafts C are operated synchronously. All of the sprocket wheels 46, which are feathered on the shaft C are mounted between the depending brackets 25 and depending bracket 50, to prevent sliding movement thereof when movement is transmitted to the shafts C.

As stated, the shafts C are mounted for sliding movement transversely of the frame, and that a means E is provided for bringing about this movement.

In order to facilitate the sliding movement of the shafts C, a transversely extending track 51 is provided for each shaft. This track 51 consists of pairs of spaced supports 52, which are secured to the upper surface of the side beams 10, and extend vertically therefrom. The upper ends of the beams 52 are connected by suitable angle irons or channel iron sections 53, which constitute the tracks. Mounted on each of the tracks are three trucks 54, provided with wheels 55, for engaging the upper surface of the angular channel iron 53. These trucks 54 are connected together by a suitable connecting piece 56. Thus it can be seen that the trucks 54 are connected together as a single unit, for movement transversely of the frame. Each one of the truck units have one of the connecting portions thereof provided with a rack face 57, and each rack face 57 has meshing therewith a spur gear wheel 58. These spur gear wheels 58 are carried by shafts 59, which have their terminals mounted respectively in a rear bearing bracket 60, and front bearings 61, which may be carried by the tracks 51. The rear ends of these shafts 59, terminate adjacent the driver's seat 22 and are provided with suitable hand wheels 62. It can be seen that by operating the hand wheels 62, the shafts C can be moved transversely, and each shaft moved independently of the other. By this arrangement, the cultivating implements B can be arranged directly in rear of each other, or can be moved to extend beyond one another, and that the combined implements on the shafts can be so arranged as to either cultivate a path or strip of land between the rows sixteen inches wide or thirty-six inches wide. If narrower or wider rows are to be cultivated, it can be seen that it is merely necessary to substitute larger or smaller cultivator members B for those already on the shafts.

Each of the trucks 54 of the truck units are provided with a depending sleeve 65, in which is mounted for non-rotary movement, a nut 66. This nut 66 has threaded therein a depending shaft 67. The lower end of this shaft 67 is swivelly connected by a suitable bearing 68, to the shafts C. By this construction, it can be seen that the shafts C are connected to the trucks 54.

The means F provided for raising and lowering the shafts C in order to regulate the depth at which the ground is to be cultivated consists of a plurality of shafts 69, the inner ends of which are provided with worms 70, which engage suitable worm wheels 71. As shown there are three shafts 69, one for each of the shafts C and the worms 70 on the shafts 69 engage respectively the worm wheels 71, as stated, which are feathered upon transversely extending actuating shafts 72, which have their terminals mounted in suitable bearing brackets 74 carried by the trucks 54. If so desired, suitable brackets 75 can be secured to the shaft for receiving the worm wheel 71, in order to prevent sliding movement thereof with the shafts 72. Each of the shafts 72 have keyed or otherwise secured thereto suitable worms 76, which mesh with relatively large worm wheels 77 which are feathered on the shafts 67. This permits the shafts 67 to be rotated and at the same time raised or lowered within the bearing sleeves 65. A suitable gage member 78 is carried by each of the truck units, and a coacting gage member 79 is carried by each one of the tracks. The gage member 79 is disposed in a vertical plane, while the gage member 78 is disposed in a horizontal plane and each of the members has suitable indicating marks thereon, so as to indicate to the operator of the machine the depth at which the ground is being cultivated, and the distance or width of the ground between the rows being cultivated. It can be seen that the gage member 78 will be raised and lowered with the truck units, and will be moved toward and away from the gage member 79 during the shifting movement of the truck units.

From the foregoing description, it can be seen that a novel cultivating machine has been provided, in which a novel form of cultivating members are used for cultivating the ground and for chopping the weeds, said members being so arranged and mounted upon the machine in such a manner that the distance between the rows to be cultivated can be readily regulated, and the depth at which the ground is to be cultivated can be readily regulated.

If so desired, the machine can be first driven over a field, and the shaft C raised to such height, where the blades or hoes 35 will simply engage the weeds so as to chop and completely destroy the weed growth, or the weeds can be destroyed at the same time that the ground is cultivated.

If relatively large growing plants are being cultivated, suitable guards 81 can be provided for the same. As shown these guards 81 are of inverted V-shaped and are mounted upon stems 82, which can slidably extend through suitable bearings 83, which are mounted upon the shafts C. These bearings 83 permit the free rotation of the shafts into the same. The upper end of the stems 82 are passed through the connecting portions 56 of the trucks 54.

Changes in details may be made without departing from the spirit or scope of this invention; but,

I claim:

1. In a cultivating machine, a frame, a plurality of independent rows of cultivator members carried by the frame arranged in rear of each other, and means for shifting the cultivator members laterally in relation to the frame and to each other, whereby the width of the rows to be cultivated can be readily regulated.

2. A cultivating machine comprising a frame, a plurality of rows of rotary cultivator members, means for independently laterally shifting the cultivator members in relation to one another, and means for adjusting the cultivator members vertically in relation to each other and to the ground.

3. An earth working machine comprising a frame, a plurality of transversely extending shafts rotatably carried by the frame disposed one in rear of the other, earth working implements of different widths mounted upon said shafts for movement therewith, and means for independently adjusting the shafts laterally of the frame.

4. An earth working machine comprising a frame, a plurality of transverse rows of rotary earth working members disposed one in rear of the other carried by the frame, and means for independently adjusting the rows of earth working members vertically in relation to each other and to said frame.

5. A cultivating machine comprising a frame, an operator's platform arranged adjacent to the rear end of the frame, a plurality of rows of rotary cultivating members, means for synchronously operating the rows of rotary cultivating members, means arranged adjacent to the driver's platform for independently adjusting the rows of cultivator implements transversely of the frame, and means arranged adjacent to the operator's platform for adjusting the rows of cultivator implements vertically, and removable V-shaped guard members for the growing plants.

6. In a cultivating machine, a frame, a plurality of depending bearings carried by the sides of the frame, a plurality of transversely extending shafts rotatably and slidably mounted in the bearings, a plurality of rotatable cultivator members mounted upon the shafts for movement therewith, the cultivator members being formed in various widths, means for independently shifting the operating shafts laterally of the frame, and means for raising and lowering the shafts in a vertical plane.

7. A cultivator machine comprising a frame, a plurality of transversely extending tracks carried by the frame, truck members mounted on the tracks for sliding movement, depending rotatable shafts carried by the trucks, transversely extending shafts, bearings for the transversely extending shafts, means swivelly connecting the first mentioned shafts with the bearings of the transversely extending shafts, a plurality of rotatable cultivator implements secured to the transversely extending shafts, means for laterally shifting the trucks, and means for rotating said first mentioned shafts for raising and lowering said transversely extending shafts.

8. In a cultivating machine, a frame, a plurality of depending bearings, a plurality of transversely extending shafts arranged in said bearings for lateral shifting movement, for rotary movement, and for movement in a vertical plane, means for operatively connecting the shafts together, means for positively driving one of the shafts, a plurality of ground working implements of different widths connected to said shafts for movement therewith, a plurality of transversely extending trucks carried by the frame and arranged above the transversely extending shafts, sliding trucks mounted for movement over said tracks, depending shafts carried by the trucks, bearings for the transversely extending shafts, means pivotally connecting the depending rotary shafts with the bearings, a plurality of operating shafts, rack bars connected with the trucks, and spur gear wheels keyed to said operating shafts and engaging said rack bars.

9. In a cultivating machine, a frame, a plurality of depending bearings, a plurality of transversely extending shafts arranged in said bearings for lateral shifting movement, for rotary movement, and for movement in a vertical plane, means for operatively connecting the shafts together, means for positively driving one of the shafts, a plurality of ground working implements of different widths connected to said shafts for movement therewith, a plurality of transversely extending tracks carried by the frame and arranged above the transversely extending shafts, sliding trucks mounted for movement over said tracks, depending shafts carried by the trucks, bearings for the transversely extending shafts, means pivotally connecting the depending rotary shafts with the bearings, a plurality of operating shafts, rack bars connected with the trucks, spur gear wheels keyed to said operating shafts and engaging said rack bars, said members carried by the trucks receiving said depending shafts, worm wheels feathered on said depending shaft, a second set of operating shafts, cross shafts carried by said trucks, means operatively connecting the second set of operating shafts with the cross shafts, and worms carried by the cross shafts engaging said worm wheels.

10. In a cultivating machine, a frame, a plurality of depending bearings, a plurality of transversely extending shafts arranged in said bearings for lateral shifting movement, for rotary movement, and for movement in a vertical plane, means for operatively connecting the shafts together, means for positively driving one of the shafts, a plurality of ground working implements of different widths connected to said shafts for movement therewith, a plurality of transversely extending tracks carried by the frame and arranged above the transversely extending shafts, sliding trucks mounted for movement over said tracks, depending shafts carried by the trucks, bearings for the transversely extending shafts, means pivotally connecting the depending rotary shafts with the bearings, a plurality of operating shafts, rack bars connected with the trucks, spur gear wheels keyed to said operating shafts and engaging said rack bars, nut members carried by the trucks receiving said depending shafts, worm wheels feathered on said depending shafts, a second set of operating shafts, cross shafts carried by said trucks, means operatively connecting the second set of operating shafts with the cross shafts, worms carried by the cross shafts engaging said worm wheels, and gage members carried by the trucks and tracks for indicating the width of the rows to be cultivated, and the depth at which the cultivating members are engaging the ground.

11. In a cultivating machine, a frame, a plurality of depending bearings carried by the frame, a plurality of transversely extending shafts rotatably mounted in the brackets and mounted for sliding movement laterally of the frame and in a vertical plane, a plurality of sprocket wheels feathered on said shafts, sprocket chains trained around said shafts for operatively connecting the same together, front and rear trucks for the train, a drive axle carried by the rear of the frame, bull wheels carried by the drive axle, a transversely extending operating shaft, sprocket wheels and chains operatively connecting the drive axle with the drive shaft, a plurality of ground engaging implements carried by the shafts, means operatively connecting the drive shaft with one of the transversely extending shafts, and means for laterally shifting the transverse shafts and for raising and lowering the same.

12. In an earth working machine, a frame, a plurality of rows of earth working members carried by the frame for lateral and vertical movement in relation to each other and to the frame, means for adjusting the rows of earth working members on said frame, and visible gauge devices for indicating the amount of adjustment of the rows of earth working members laterally and vertically of the frame.

GERZONY DIOSZEGI.